(12) United States Patent
Kuwahara et al.

(10) Patent No.: US 6,704,547 B2
(45) Date of Patent: Mar. 9, 2004

(54) WIRELESS COMMUNICATION BASE STATION TRANSMISSION TIMING OFFSET CORRECTION SYSTEM

(75) Inventors: Mikio Kuwahara, Kokubunji (JP); Tomoaki Ishifuji, Tokyo (JP); Nobukazu Doi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 426 days.

(21) Appl. No.: 09/793,908

(22) Filed: Feb. 28, 2001

(65) Prior Publication Data

US 2002/0009974 A1 Jan. 24, 2002

(30) Foreign Application Priority Data

Jul. 17, 2000 (JP) .......................... 2000-221043

(51) Int. Cl.⁷ ........................... H04B 17/00; H04Q 7/20
(52) U.S. Cl. ............................. 455/67.16; 455/456.1; 342/357.03
(58) Field of Search ..................... 455/67.16, 67.15, 455/502, 504, 506, 456.1, 456.6, 456.5; 342/357.02, 357.08, 357.56, 357.03, 357.1, 357.09, 457, 375, 357.12; 370/350

(56) References Cited

U.S. PATENT DOCUMENTS

| | | | |
|---|---|---|---|
| 4,411,007 A | | 10/1983 | Rodman et al. |
| 4,510,600 A | | 4/1985 | Tan |
| 5,155,490 A | * | 10/1992 | Spradley, Jr. et al. ... 342/357.03 |
| 5,319,679 A | | 6/1994 | Bagby |
| 5,361,398 A | | 11/1994 | Christian et al. |
| 5,521,887 A | * | 5/1996 | Loomis ........................ 368/47 |
| 5,663,735 A | * | 9/1997 | Eshenbach ............. 342/357.15 |
| 5,748,681 A | | 5/1998 | Comino et al. |
| 5,764,648 A | | 6/1998 | Yamane et al. |
| 5,815,538 A | * | 9/1998 | Grell et al. .................. 375/356 |
| 5,838,672 A | | 11/1998 | Ranta |
| 5,875,402 A | | 2/1999 | Yamawaki |
| 5,999,124 A | * | 12/1999 | Sheynblat .............. 342/357.09 |
| 6,002,363 A | * | 12/1999 | Krasner .................... 342/357.1 |

(List continued on next page.)

FOREIGN PATENT DOCUMENTS

| | | |
|---|---|---|
| JP | 07-181242 | 7/1995 |
| JP | 09-311177 | 12/1997 |
| JP | 2000-075012 | 9/1998 |
| TW | 380345 | 7/1998 |
| WO | WO 99/651163 A1 * 12/1999 | ............ H04B/7/26 |

OTHER PUBLICATIONS

US patent application Publication, Pub No. 2001/0022779 A1, Pub Sep. 20, 2001, filed Apr. 25, 2001, Wheatley, III et al.

(List continued on next page.)

*Primary Examiner*—Charles Appiah

(57) ABSTRACT

An apparatus, system and method for measuring timing of a signal transmitted from a wireless base station antenna. The apparatus and system include a wireless base station antenna that transmits a first signal, and a transmission timing measurement apparatus having a first antenna and a second antenna that receives an accurate time value and the first signal, and that outputs an offset of the first signal from the accurate time value. The method includes receiving an accurate time, receiving the reception time transmitted from the wireless base station antenna, receiving the reception time value and the accurate time value, and comparing of the reception time value and the accurate time value.

8 Claims, 3 Drawing Sheets

U.S. PATENT DOCUMENTS

| | | | |
|---|---|---|---|
| 6,032,033 A | | 2/2000 | Morris et al. |
| 6,041,222 A | * | 3/2000 | Horton et al. ............... 455/255 |
| 6,052,081 A | | 4/2000 | Krasner |
| 6,058,150 A | | 5/2000 | Ghosh |
| 6,072,421 A | | 6/2000 | Fukae et al. |
| 6,108,553 A | | 8/2000 | Silventoinen et al. |
| 6,185,429 B1 | | 2/2001 | Gehrke et al. |
| 6,201,499 B1 | | 3/2001 | Hawkes et al. |
| 6,201,802 B1 | | 3/2001 | Dean |
| 6,201,803 B1 | | 3/2001 | Munday et al. |
| 6,205,125 B1 | | 3/2001 | Proctor et al. |
| 6,236,359 B1 | * | 5/2001 | Watters et al. ........... 342/357.1 |
| 6,246,884 B1 | | 6/2001 | Karmi et al. |
| 6,249,253 B1 | * | 6/2001 | Nielsen et al. ............... 342/463 |
| 6,266,361 B1 | | 7/2001 | Huang et al. |
| 6,275,705 B1 | * | 8/2001 | Drane et al. ................. 455/456 |
| 6,433,734 B1 | * | 8/2002 | Krasner ................. 342/357.09 |

OTHER PUBLICATIONS

US patent application Publication, Pub No. 2001/0044311 A1, Pub. Nov. 22, 2001. filed Jul. 27, 1998, Larsson et al.

US patent application Publication, Pub No. 2001/0046872 A1, Pub. Nov. 29, 2001, filed Jun. 4, 2001, Masuda et al.

US patent application Publication, Pub No. 2002/0001299 A1, Pub. Jan. 3, 2002, filed Apr. 18, 2001, Petch et al.

US patent application Publication, Pub No. 2002/0004398 A1, Pub. Jan. 10, 2002, filed Feb. 13, 2001, Ogino et al.

* cited by examiner

WIRELESS COMMUNICATION BASE STATION TRANSMISSION TIMING OFFSET CORRECTION SYSTEM

PRIORITY TO FOREIGN APPLICATIONS

This application claims priority to Japanese Patent Application No. P2000-221043

BACKGROUND OF THE INVENTION

1. Field of the Invention

The present invention relates to position measurements for wireless communication, and, more particularly, to a wireless base station transmission timing position measurement system.

2. Description of the Background

A position measurement system using a wireless base station is disclosed in the Japanese Published Unexamined Patent Application No. Hei 7-181242. In that application, a terminal receives signals transmitted by a plurality of base stations, calculates the distance between each base station from which a signal is received and the terminal based on the timing delay properties of the received signal, and thereby measures the location of the terminal.

Many base stations are currently employed in a code division multiple access (CDMA) network or networks. In a typical CDMA network embodiment, a base station includes a system whereby the timing of transmission is determined in synchronization with the timing of the Global Positioning System (GPS). FIG. 2 illustrates the configuration of a base station system synchronized with the GPS. GPS artificial satellites 1, 2 and 3 exhibit an extremely accurate timing function, and each of the artificial satellites transmits a signal of a unique pattern. Upon receipt of a signal from a GPS satellite, wireless base stations 5, 6 and 7 have the capability to calculate the respective locations and time delays of a plurality of received waves, as well as orbit timing information, from the GPS satellites. The reception of this information from the GPS system enables each base station, like the GPS satellites, to maintain an extremely accurate time stamp. Through the use of this extremely accurate time stamp, each base station can transmit signals of a pattern unique to that base station at an accurately synchronized timing with other base stations in the network utilizing the GPS system for timing. Based on the same principle as discussed hereinabove with respect to the plurality of base stations, mobile terminal 4 has the capability to accurately measure time, and to thereby measure location.

Each wireless base station illustrated in FIG. 2 preferably includes an antenna having an unobstructed "view" of at least a portion of a wireless communication field. Such an unobstructed view may, for example, be gained through the placement of the antenna on the roof of a building. Typically, the remainder of the base station apparatus is placed within the building. Signals transmitted from the GPS satellites 1, 2 and 3 are received by a GPS antenna 13 located on or near the base station, and the GPS antenna 13 passes to a GPS receiver 14 the estimated spatial position and time.

A reference clock generator 15 then calibrates the reference clock generator time, i.e. the reference clock generator oscillator, on the basis of the time information estimated from the GPS receiver 14, and thereby achieves an adjustment to the correct transmission time, according to the GPS time, for the attached base station 6. The reference clock generated by the reference clock generator 15 is supplied to a base band unit 12, and an RF unit 11. The base band unit 12 generates the signals to be transmitted from the antenna 10, and the RF unit 11 converts the signals to be transmitted into signals of a radio frequency for transmission via antenna 10.

In order to allow synchronization and signal reception, as well as position measurement, such as in a CDMA system, the transmission timing at which an electric wave is actually transmitted from an antenna must be very accurate. However, it will be apparent to those skilled in the art that, because a GPS antenna and a base station antenna are placed at a distance from the respective base band apparatus, the electric wave takes time to travel over cables to reach from the antennae to the base band unit 12. Further, the lengths of the cables connecting the antennae and the corresponding base band unit 12 vary with the layout of each site of installation. Moreover, since a reference clock generator 15 and a base band unit 12 each include filters for wave manipulation, the respective filtering systems can cause additional wave propagation delays. Additionally, as newly installed base station technologies may use different components, delays attributable to filters may differ or increase with each new generation of technology.

The time difference due to cabling and filtering at each base station is hereinafter referred to as a "base station transmission timing offset" or "offset". It will be apparent to those skilled in the art that transmission timing information is sent by a base station to allow a receiver to calculate propagation time, i.e. reception time at the terminal less transmission time, and thereby to allow for terminal location via triangulation, for example. However, due to the transmission timing offset, which is itself due to differences in cabling and filtering that cause the base station transmission timing offset to be intrinsic to each base station, propagation times can often not be properly calculated, because the transmission time received is not the correct transmission time, due to the offset. The timing at which a wave is actually transmitted from an antenna 10, versus the time at which the corresponding base band unit 12 intends to generate the wave, are different according to the cabling and filtering delays inherent in each system. In light of the transmission timing offset, a position measurement terminal notified of the time at which a base station intends to send a signal will deviate in the calculation of position the equivalent of the base station transmission timing offset.

A DGPS system calculates the position at a point of known location on the ground using GPS, and transmits the resultant compensation information by way of FM signals or the Internet. GPDS is often used with GPS-based systems. An embodiment of a GPDS system is described in Japanese Published Unexamined Patent Application No. Hei 9-311177. The use of GPDS allows for the compensation of delay lengths in propagation through the ionosphere, which delay lengths may vary from moment to moment, and according to the orbit of GPS satellites. However, the GPDS method is inapplicable to any position measurement system wherein the signal sources are cellular stations, because, in light of the fact that cellular base stations are at ground level, the intensity of signals transmitted from a nearby base station versus that from a distant base station may differ widely, thereby resulting in a relative distance problem, meaning that signals from many base stations cannot be measured at the same time at a single detecting station.

Therefore, the need exists for a system, apparatus, and method for compensating a base station for a transmission timing offset.

SUMMARY OF THE INVENTION

The present invention is directed to a transmission timing measurement apparatus for measuring timing of a signal transmitted from a wireless base station antenna. The transmission timing apparatus includes an accurate time reception antenna that receives an accurate time value, a cellular antenna that receives a reception time value of the signal transmitted from the wireless base station antenna, and a reference clock generator that receives the reception time value and the accurate time value. The reference clock generator compares the reception time value and the accurate time value into a reference output. The reception time value generally includes a transmission time stamp of the signal transmitted from the wireless base station antenna, and the reference clock generator preferably subtracts a propagation time from the accurate time value to form a first sum, and then compares the first sum to the transmission time stamp into the reference output. The reference output may adjust the timing of the signal transmitted from the wireless base station antenna, and one or more reference outputs may be stored in a memory unit.

The present invention is also directed to a transmission timing measurement system. The system includes an accurate time generator that transmits an accurate time value, at least one wireless base station antenna that transmits a first signal, and a transmission timing measurement apparatus having a first antenna and a second antenna that receives the accurate time value at the first antenna and the first signal at the second antenna, and that outputs an offset of the first signal from the accurate time value. The system may additionally include a center, and the offset for at least three of the wireless base station antennae may be stored in the center. The system also preferably includes a terminal. The terminal accesses the center and receives therefrom the offset for at least three wireless base station antennae in communication with the terminal. Either the terminal or the center may then perform a position location of the terminal.

The present invention is additionally directed to a method for measuring timing of a signal transmitted from a wireless base station antenna. The method includes the steps of receiving, at a first antenna, an accurate time, outputting, from the first antenna, the accurate time value at reception of the signal transmitted from the wireless base station, receiving, at a second antenna, the signal transmitted from the wireless base station antenna, outputting, from the second antenna, a reception time value of the signal transmitted from the wireless base station antenna, receiving, at a reference generator, the reception time value of the signal transmitted from the wireless base station antenna, and the accurate time value, and comparing, by the reference generator, of the reception time value and the accurate time value into a reference output. The method may additionally include the step of adjusting the timing of the signal transmitted from the wireless base station antenna according to the reference output. The method also preferably includes the steps of storing the reference output, accessing, by a terminal, of the stored reference output, receiving, by the terminal, of the reference output for at least three wireless base station antennae in communication with the terminal, and locating the physical position of the terminal according to the communication with the terminal from the wireless base station antennae and the reference outputs.

Thus, the present invention provides a system, apparatus, and method for compensating a base station for a transmission timing offset that do not require a site for a detecting station, as in Japanese Published Unexamined Patent Application No. Hei 9-311177, and that do not encounter multipath or relative distance difficulties.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical telecommunications system. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
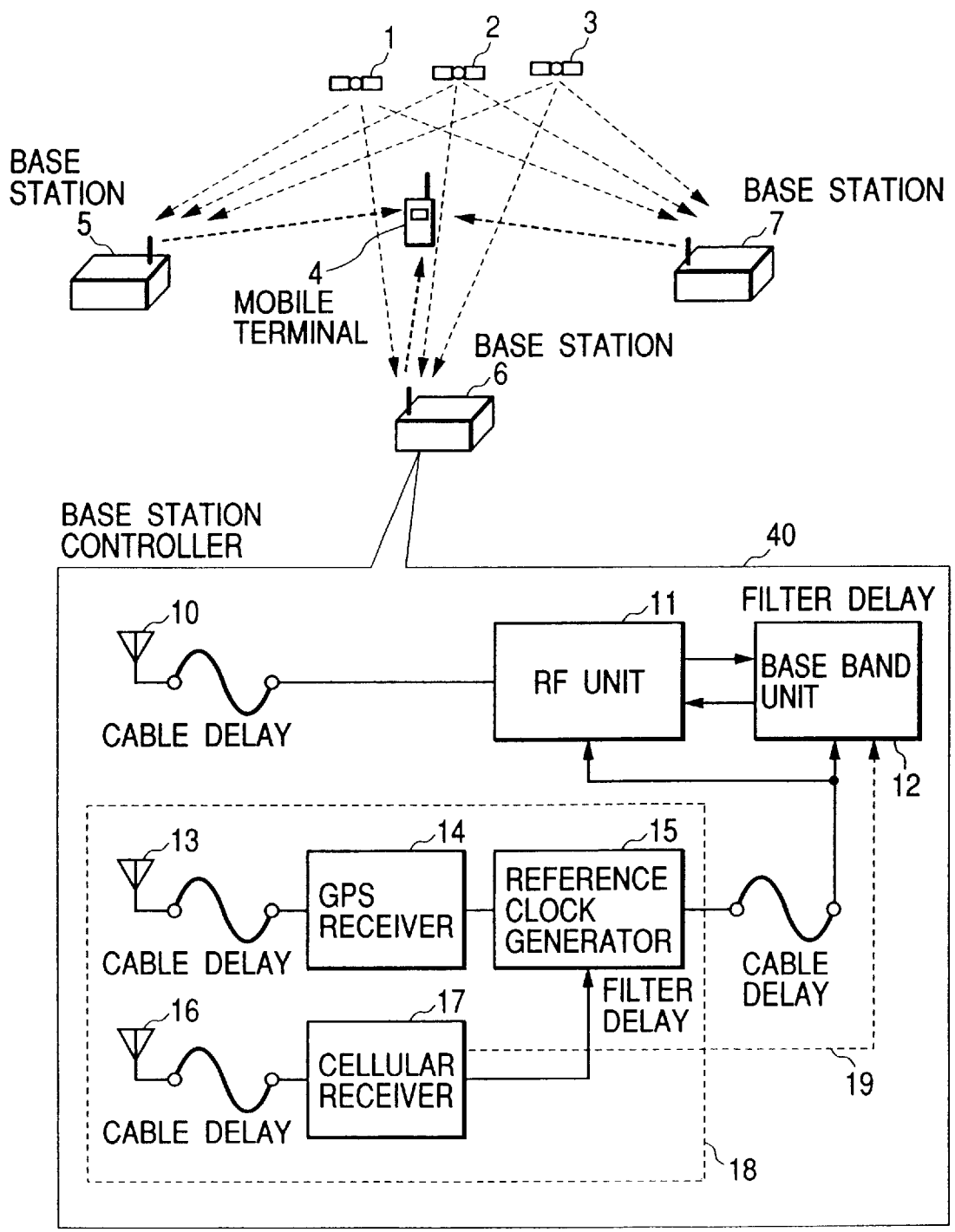
FIG. 1 is a block diagram illustrating a wireless communication base station transmission timing offset correction system.
Figure 2:
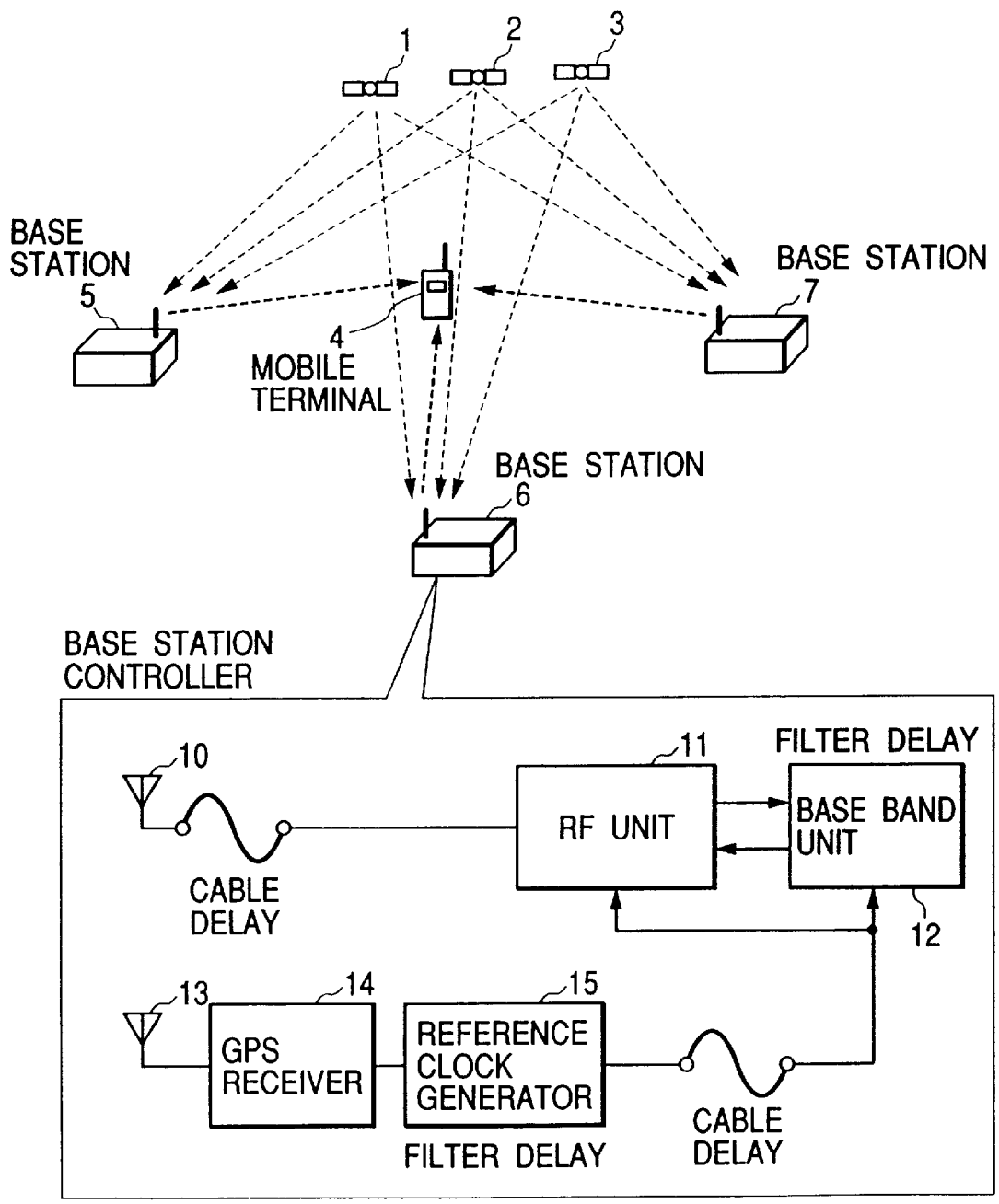
FIG. 2 is a block diagram illustrating the configuration of a base station system synchronized with the GPS.

FIG. 1 is a block diagram illustrating a wireless communication base station transmission timing offset correction system. The system includes GPS satellites 1, 2, 3, base stations 5, 6 and 7 that receive and synchronize signals from GPS satellites 1, 2 and 3, mobile terminal 4, which, on the basis of signals transmitted from the base stations, detects position, and base station controller 40.

Each base station controller 40 preferably includes a transmission timing measurement apparatus 18 having therein a GPS antenna 13 and a cellular antenna 16. Preferably, the cellular antenna 16 is connected to a cellular receiver 17, and receives signals transmitted from the antenna 10 of the base station 6. In one embodiment of the present invention, the cellular antenna 16 is installed remotely from base station antenna 10, although the maximum power received signal, without excessive interference, must still be the antenna 10 then of interest to cellular antenna 16, or the signal of the antenna 10 then of interest to cellular antenna 16 must identify itself and be selected for monitoring by cellular antenna 16. However, the present invention may alternately be operated using a cellular antenna 16 branched by coupling, using a cable or an antenna element, from the base station antenna 10. The GPS antenna 13 is preferably connected to a GPS receiver 14, and receives signals from the GPS satellites 1, 2, 3.

Each base station controller 40 also preferably includes a reference clock generator 15. The reference clock generator 15 speeds or slows the base station system clock to thereby substantially eliminate the transmission timing offset. The reference clock speeds up the system clock more in the instance wherein the delay from the offset is great, and less wherein the delay is smaller. Thus, the reference clock generator 15 generates an accurate reference clock by calibrating the base station internal clock based on the position of the GPS receiver 14 and the time at the GPS receiver 14, and based on the feedback, through the base band unit 12, RF unit 11, and antenna 10 of the timing of the signal from the cellular base station 6, as received at cellular receiver 17 via the cellular antenna 16, compared with the GPS time, by the reference clock generator 15.

For example, the reference clock generator 15 may receive the reception time value of the signal transmitted from the wireless base station antenna 10, which is equivalent to the time stamp of transmission placed by the base station 6 plus the propagation time to the cellular antenna 16, and the reference clock generator 15 receives the accurate reception time value of reception via the GPS receiver 14, and, by subtracting the propagation time from each reception time value, the actual transmission time is known, as is the transmission time according to the time stamp of base station 6, and the reference clock generator 15 then adjusts the time stamp of the signal transmitted from the base station antenna 10 accordingly.

In an additional preferred embodiment, the comparison at reference clock generator 15 includes a subtraction of propagation time only from the GPS receiver 14 time value, and a comparison of that result with the time stamp of transmission from base station 6 (wherein the transmission time stamp is herein defined to be included in the "reception time" received according to cellular antenna 16) thereby allows for a correspondent adjustment in the time stamp of the signal transmitted from the base station antenna 10. Thus, the comparison of the GPS time with the cellular receiver reception time at the reference clock generator 15 allows a measurement of the exact actual time at which the signal was transmitted from the antenna 10 of the cellular base station 6 to the cellular antenna 16. It will be apparent to those skilled in the art that, although the exemplary embodiment of the present invention is discussed herein with respect to GPS timing, the accurate time measurement mechanism is not limited to GPS, but may include any very accurate time keeping methodology, such as, but not limited to, a cesium clock provided at each base station 6, or an atomic clock. Further, it should be noted that, although a cable delay may be present in the GPS receiver 14 time, this delay is easily calibrated out where one measurement of actual GPS time is known, or where the length of GPS receiver cable is known or is a consistent length across all base stations 5, 6, 7. In the case of a known GPS cabling delay, the total delay, less the known GPS cabling delay, yields the delay of the cellular antenna 16 cabling system.

When the position of the base station antenna 10 is entered into the reference clock generator 15 in advance, or is gained from the GPS signal, the propagation distance from the antenna 10 to the transmission timing measurement apparatus 18 can be calculated based on the position as measured by the GPS receiver 15 at apparatus 18. Division of this distance by the velocity of light yields the propagation time used in the calculation by the reference clock generator 15 hereinabove. Because an accurate reception time for the signal transmitted from the base station antenna 10 is already known at the cellular antenna 16 and the cellular receiver 17 as described hereinabove, subtraction of the propagation time from the reception time yields the time at which the wave was actually transmitted from the base station antenna 10, according to the base station 6. The reference clock generator 15 generates a reference clock such that the correct value is given as this transmission time.

The base station controller 40 preferably additionally includes a base band unit 12. The base band unit 12 generates a base band signal matching the signal transmitted from the base station antenna 10. The signal generated by the base band unit 12, after being modulated by the RF unit 11 into a carrier frequency, is transmitted from the base station antenna 10. The timing of the signal transmitted from the base station antenna 10 is synchronized with the reference clock generator 15, and thus is controlled by the reference clock generator 15. It should be noted that a base station 6 covering a large number of mobile terminals 4 generally cannot suddenly alter the timing of the signal transmitted, and consequently the reference clock generator 15 preferably eliminates deviations in the time of signal transmission from the base station antenna 10 by repetition of a very small adjustment, such a "delay" or "advance" of $\frac{1}{16}$ in every 80 millisecond frame, for example.

Cable delays occur when a signal is inputted from the GPS antenna 13, or the cellular antenna 16, to the respective receiver 14, 17. Cable delays may also occur within the receiver, or over the connection between the receiver 14, 17 and the reference clock generator 15. However, for a position measurement, no error in terminal position measurement will occur if the relative reception timing difference of the signal transmitted from each base station, i.e. time difference of arrival (TDOA), is accurately calculated. Therefore, any additional error due to unforeseen cable delays or the like is reduced or eliminated through the use of a transmission timing measurement apparatus 18 of an equivalent cable length and having equivalent component delays.

Although the exemplary embodiments hereinabove were described using a single base station antenna, it will be apparent to those skilled in the art that the present invention can also be effectuated using a plurality of antennae 10, such as, for example, sector antennae. However, the plurality of antennae must be subject to common control effectuated with a common reference clock generator 15, and the plurality of antennae cabling must be equivalent in cable length, in order that each sector will necessitate the same adjustment by the common reference clock generator 15. In an exemplary embodiment employing a plurality of antennae, signals compensating for delay differences among sectors, as revealed by the cellular receiver 17, must be fed back to the base band unit 12 of each base station 5, 6, 7. Thereby, each sector may be individually controlled, and the transmission timing may be separately adjusted for each sector.

In an additional exemplary embodiment not operating on a one-to-one antenna 10 to cellular antenna 16 correspondence, each base station 5, 6, 7 includes antenna 10, RF unit 11, and base band unit 12. However, transmission timing apparatus 18 operates to serve at least two base stations, such as base stations 6, 7. The transmission timing apparatus 18 in this embodiment is programmed to monitor one base station, such as base station 6, according to the identifying information of that base station 6, and then modify the clock of that base station 6 via a reference clock generator 15 feedback loop. This process is then repeated for base station 7, and so on. The transmission timing apparatus 10 may be remotely located from each or all base stations 5, 6, 7 in this embodiment, necessitating a sending of adjustment information to each base station via cable, RF, or fiber optic methodologies. However, the co-location of the transmission timing measurement apparatus 18 and the base station apparatus eliminates any effects on the present invention of a multipath problem.

With respect to FIG. 1, it will be apparent to those skilled in the art that each base station 5, 6, 7 used by a terminal 4 to perform location via triangulation must be equipped with transmission timing apparatus 18 in order to generate an accurate location of the terminal 4.

Figure 3:
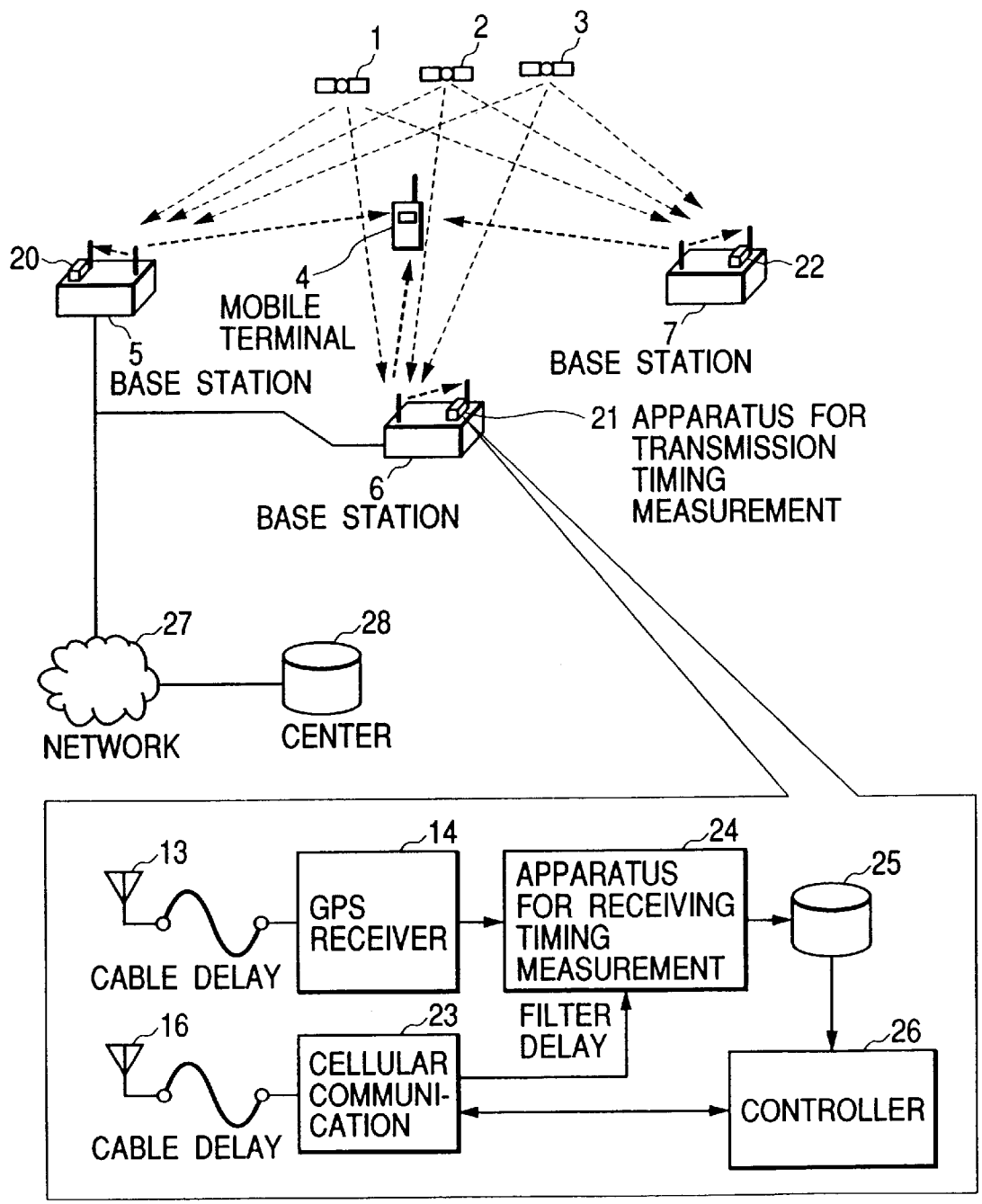
FIG. 3 is a block diagram illustrating a wireless communication base station transmission timing offset correction system.

FIG. 3 is a block diagram illustrating an additional preferred embodiment of the present invention. According to FIG. 3, the transmission timing of the base station 5, 6, 7 is preferably not adjusted. Each of the base stations 5, 6, 7 includes a transmission timing apparatus 20, 21, 22 in communicative connection thereto.

The transmission timing measurement apparatus 20, 21, 22 of FIG. 3 includes a GPS antenna 13 and a cellular antenna 16. The GPS receiver 14 determines the geographic position at which the transmission timing measurement apparatus 21 is located, and the exact time of the signals received by the GPS antenna 13 from the GPS satellites 1, 2, 3, and generates a reference GPS clock signal. The cellular communication unit 23 receives a signal transmitted from a base station antenna 10 via the cellular antenna 16, and measures the reception timing of the pilot signal of the corresponding base station 5, 6, 7. The measurement of the pilot signal may include, for example, the use of a sliding correlator matched with the pilot signal transmitted by the base station 5, 6, 7, to thereby measure the timing of signal reception from the phase in which correlation becomes more significant. Due to the fact that the pilot signal is a periodic signal, the measuring of the pilot signal may include continuous monitoring, or may include measuring of the signal for a predetermined period and an averaging of the results over the predetermined period. Averaging can enhance the accuracy of reception timing measurement. Generally, where the error in one measurement is $\sigma$, and the error is an independent event in every measurement, averaging of the results of N measurements can reduce the error to $\sigma/\sqrt{N}$.

A reception timing measurement apparatus 24, such as a reference clock generator 15, measures, on the basis of the accurate clock obtained by the GPS receiver 14, the comparative accuracy of the reception timing of the pilot signal as determined by the comparison of the cellular communication unit 23 and the GPS receiver 14, which comparison may be performed by the subtraction of propagation time methodologies discussed hereinabove with respect to FIG. 1. The comparative reception timing so measured is stored in memory unit 25. The reception timing values stored in the memory unit are then converted by control apparatus 26 into error information on the transmission timing, which error information is forwarded to center 28.

The physical location of the antenna of the base station 5, 6, 7 of interest is also preferably stored in the controller 26. Due to the fact that the location of the transmission timing measurement apparatus 20, 21, 22 is known based on the output of the GPS receiver 14, the distance between the base station antenna 10 and the transmission timing measurement apparatus 20, 21, 22 is known based on the difference between the two known positions. Division of this difference by the velocity of light gives the length of time taken by a wave to propagate from one antenna to the other, and the transmission timing at the tip of the antenna 10 of the base station 5, 6, 7 can be measured from the known reception timing, as discussed hereinabove with respect to FIG. 1. The error in transmission timing is then estimated from the difference between the measured transmission timing and the expected transmission timing at the base station.

The control apparatus 26 regularly delivers determined error information on the transmission timing to the center 28, and the center is preferably along a network 27. This error information may be transmitted by wired or wireless means to the center 28 by the controller 26. Error information on the reception timing (offset information) may be delivered to the center 28, for instance, over a cellular network via the cellular communication unit 23.

The information accumulated at the center 28 is downloaded to the terminal 4 upon a request from the terminal 4 for location measurement. At the terminal 4, the location is calculated by using the compensated reception timing information obtained by subtracting from the reception timing measured at the terminal the offset equivalent attributable to the error according to the center 28. Details of a position calculating method are described in Japanese Published Unexamined Patent Application No. Hei 7-181242. Thus, although the transmission timing of the base station remains offset, an accurate location can be calculated by the terminal 4 due to the compensation by the terminal for the timing offset values of the base stations.

The transmission timing measurement apparatus 20, 21, 22 may be, but need not be, permanently installed at the respective base station 5, 6, 7, and the apparatus 20, 21, 22 preferably performs a GPS synchronization. However, base stations are also often synchronized with GPS. Further, most of the cabling and filtering delays that contribute to the timing offset are fixed, and thus need not be repeatedly re-calculated. In the instance wherein a base station is synchronized to GPS, once the transmission timing offset is measured, the compensation value for the transmission timing offset varies little over time. Therefore, the transmission timing measurement apparatus need only measure the transmission timing offset once, and then store the result of that measurement of timing offset at the center 28, in order to enable location measurement. Where the transmission timing apparatus 20, 21, 22 is only used once, it may be preferable to use a portable transmission timing measurement apparatus 20, 21, 22. For example, the transmission timing offset may be measured in numerous locations, for the same or multiple base stations, using a vehicle-mounted transmission timing measurement apparatus, and the compensation for the timing offset calculating may then be the resulting average of a series of measured values stored at the center 28.

Using the system of FIG. 3, compensation for timing offset may be performed at the center 28. For example, a calculation may be employed wherein a terminal 4 measures the reception timing at a nearby base station 6 and transmits the resulting timing measurement to the center 28. At the center 28, the offset of the transmission timing may then be compensated for on the basis of the information transmitted by the terminal 4, and the known offset value of that base station at the center 28. The location of the terminal 4 may then be generated at the center 28, and may be transmitted to the terminal 4. Thus, in an embodiment wherein the immediate compensation of the transmission timing offset is not necessary, a transmission timing apparatus 20, 21, 22 configuration for collectively managing timing offset values at the center 28 may be used according to the present invention. However, it should be noted that the co-location of the transmission timing measurement apparatus and the base station apparatus eliminates any effects on the present invention of a multipath problem.

It will be noted by those skilled in the art that, with respect to the embodiments presented in FIGS. 1 and 3, most base stations are synchronized with GPS, or a similar timing system, and thus, once a timing offset is compensated, or once the necessary timing compensation value is measured, the calculation does not need to be repeated on a frequent basis. Typically, the value may vary on the order of a few hours to a few days, and thus re-calculation at hourly intervals would be more than sufficient for proper operation of the present invention.

Through the use of the present invention, offsets in the transmission timing of a base station can be compensated for. This compensation results in enhanced accuracy of the estimation of a terminal location. Other advantages and benefits of the present invention will be apparent to those skilled in the art.

The present invention is not limited in scope to the embodiments discussed hereinabove. Various changes and modifications will be apparent to those skilled in the art, and such changed and modifications fall within the spirit and scope of the present invention. Therefore, the present invention is to be accorded the broadest scope consistent with the detailed description, the skill in the art and the following claims.

What is claimed is:

1. A transmission timing measurement system for measuring at least one cellular signal transmission time offset of a wireless base station antenna due to cabling and filtering of the base station, comprising:
   a GPS antenna, wherein said GPS antenna receives GPS signals transmitted from a plurality of GPS satellites;
   a GPS receiver coupled to said GPS antenna, wherein said GPS receiver generates an clock signal based on said GPS signal;
   a cellular antenna, wherein said cellular antenna receives said cellular signal transmitted from the wireless base station antenna;
   a cellular communication unit coupled to said cellular antenna, wherein said cellular communication unit outputs a reception timing of the cellular signal; and
   a receiving timing measurement apparatus coupled to said GPS receiver and said cellular communication unit such that a timing offset caused by the system is included in the transmission time offset, wherein said receiving timing measurement apparatus measures a reception time value of the cellular signal transmitted from the wireless base station antenna based on said clock signal and said reception timing.

2. The transmission tinting measurement apparatus of claim 1, further comprising a memory unit coupled to said receiving timing measurement apparatus, wherein said memory unit stores the reception time value.

3. The transmission timing measurement apparatus of claim 1, further comprising a controller coupled to said memory unit, wherein
   said GPS receiver generates an location signal indicating a location of said transmission timing measurement apparatus, and
   said controller generates a compensation signal based on said reception time value, said location signal, and locations of said GPS satellites.

4. The transmission timing measurement apparatus of claim 3, wherein the compensation signal is used to adjust the receiving timing of the signal transmitted from the wireless base station antenna.

5. A wireless position measurement system using signals from a plurality of base stations, comprising:
   a plurality of transmission timing measurement apparatuses, each of which measures at least one transmission timing offset of one of said plurality of base stations due to cabling and filtering of the base station, said transmission timing measurement apparatuses comprises:
      a cellular antenna and a cellular receiver receiving a specific signal transmitted from the one of said plurality of base stations;
      a cellular communication unit coupled to said cellular antenna, wherein said cellular communication unit outputs a reception timing of a signal transmitted from one of said plurality of base stations:
      a GPS antenna and a GPS receiver for receiving GPS signals transmitted from a plurality of GPS satellites:
      a measurement apparatus coupled to said GPS receiver and said cellular communication unit such that a timing offset caused by the system is included in the transmission timing offset, wherein said measurement apparatus measures a reception time value of the specific signal transmitted from the base station based on a universal timer function and said reception timing, wherein said universal timer function is generated based on the GPS signals; and
      a center for storing the transmission timing offset thereby compensating the transmission timing offset for the one of said plurality of base station with a compensation value.

6. The wireless position measurement system of claim 5, wherein said center, upon a request from a mobile terminal, transmits the compensation value for the one of said plurality of base stations to the mobile terminal, and
   wherein the mobile terminal calculates a position of the mobile terminal by compensating a reception timing of a signal from the one of said plurality of base stations to the mobile terminal which is measured by the mobile terminal.

7. The wireless position measurement system of claim 5, wherein said mobile terminal transmits the reception timing measured by the mobile terminal to the center such that the center calculates a position of the mobile terminal by compensating the reception timing with the transmission timing offset.

8. The wireless position measurement system of claim 5, wherein each of the transmission timing measurement apparatuses is resident an identical physical location as a base station antenna.

* * * * *